Oct. 8, 1946.　　　C. M. OSTERHELD　　　2,408,874
THERMAL RETARDER
Filed May 29, 1944
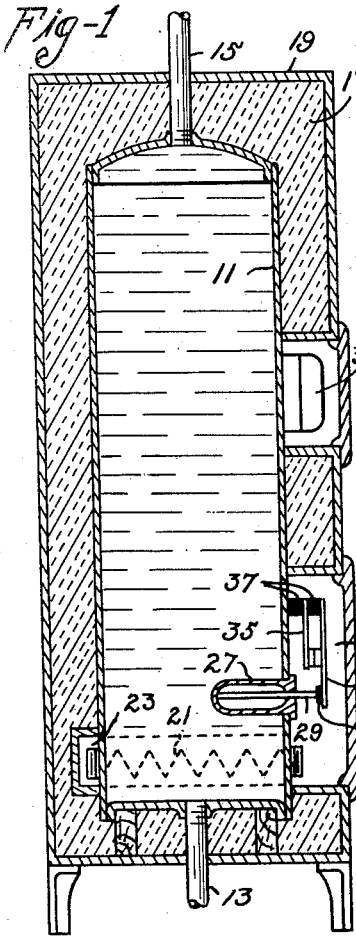
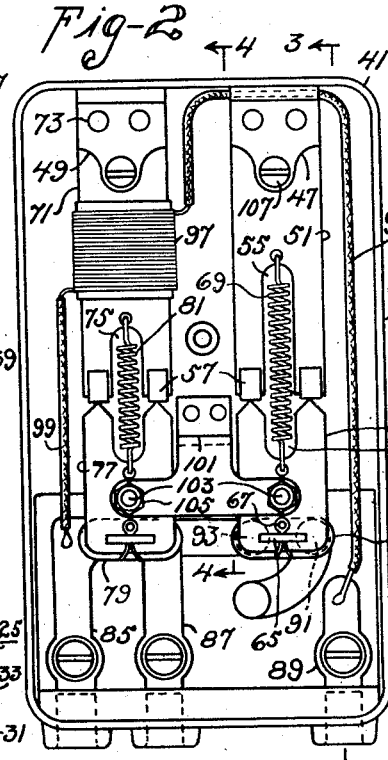
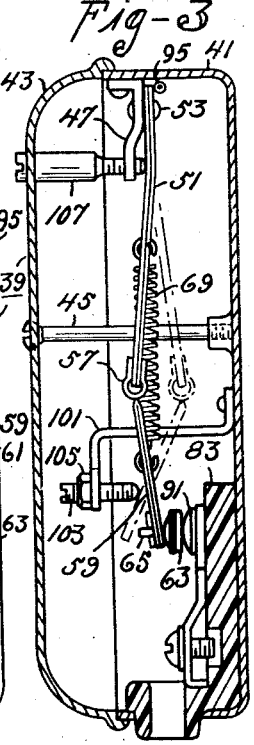
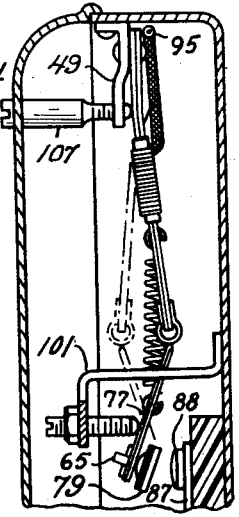
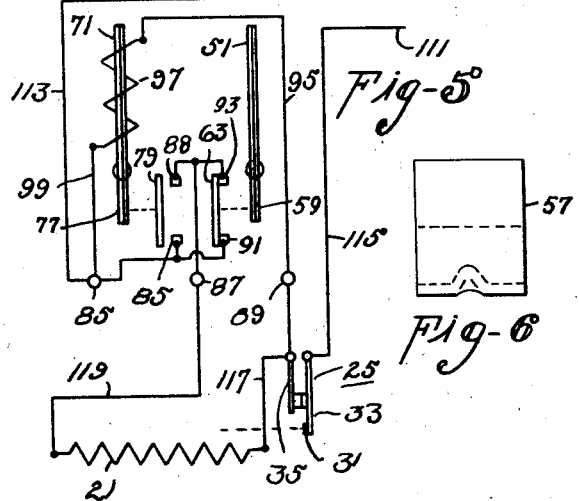
INVENTOR.
CLARK M. OSTERHELD
BY
ATTORNEY Patented Oct. 8, 1946

2,408,874

UNITED STATES PATENT OFFICE 2,408,874

THERMAL RETARDER

Clark M. Osterheld, Stoughton, Wis., assignor to McGraw Electric Company, Elgin, Ill., a corporation of Delaware Application May 29, 1944, Serial No. 537,941

13 Claims. (Cl. 219—39)

My invention relates to electric heating and particularly to thermal retarder control switch units for electric heaters of domestic hot water storage tanks.

An object of my invention is to provide a novel and improved form of thermal retarder heater control switch unit.

Another object of my invention is to provide a thermal retarder heater control switch unit including two dissimilarly thermally-expansible snap-acting switch mechanisms separate from one another.

Another object of my invention is to provide a thermal retarder heater control switch unit that shall be selectively effective to cause energization of an electric heater of a domestic hot water storage tank immediately or after a predetermined time period of delay in accordance with the amount of cold water in the tank.

Other objects of my invention will either be apparent from a description of my improved form of device or will be pointed out in the course of such description and set forth in the appended claims.

In the drawing,

Figure 1 is a vertical, sectional view of an ordinary domestic hot water tank, with which is associated a device embodying my invention, Fig. 2 is a front view of my improved thermal retarder with the cover removed, Fig. 3 is a sectional view on the line 3—3 of Fig. 2 showing the first bimetal bar and contacts in full lines, in position when the tank is filled with cold water so that the thermal retarder is subject to cold water, Fig. 4 is a sectional view on the line 4—4 of Fig. 2 showing the second bimetal bar and contacts controlled thereby in full lines when in open position, Fig. 5 is a diagram of electric circuits used with my improved thermal retarder.

Fig. 6 is a front view of a pivot plate, and,

Fig. 7 is an end view of Fig. 6.

Referring first of all to Fig. 1 of the drawing, I have there illustrated a domestic hot water tank 11 having a lower cold water inlet pipe 13, an upper hot water outlet pipe 15, and being covered by heat-insulating material 17, which material may be held in proper operative position around the tank by an outer casing 19.

I provide preferably, but not necessarily, a single electric heater 21, which, when only a single electric heater is provided, is positioned around the tank adjacent the lower end thereof and may be positioned in a tunnel member 23. I have illustrated the electric heater 21 generally only, since heaters of this general kind are old and well known in the art, the same comments applying also to the details of construction and assembly of the tank 11.

I provide a lower or main thermally-actuable heater control switch designated in its entirety by numeral 25. This switch is also shown generally or schematically only and comprises a tube 27 having a closed inner end and having its open outer end portion secured in a fluid-tight manner in an opening in tank 11 adjacent the lower portion thereof. An expansion rod 29 is positioned within the tube 27 and is adapted to be subject to the temperature of the water in the tank. The outer end of rod 29 is adapted to engage with and be disengaged from a small block 31 of electric-insulating material secured to the free or movable end of a resilient contact arm 33. A contact member on arm 33 is adapted to engage with and be disengaged from a contact member on a substantially rigid contact arm 35, the two contact arms being supported in heat-receiving relation and electrically-insulated from one another as by blocks 37 of suitable material. When tube 27 is positioned in cold water, by which I mean water the temperature of which is on the order of 60 to 70° F., the length of expansion rod 29 will be a minimum and contact arm 33 will then be in engagement with contact arm 35 so that the two contact members supported by the respective arms will be in electric-conducting engagement with each other. When tube 27 is positioned in or surrounded by hot water, by which I mean water the temperature of which is on the order of 150° F., the length of expansion rod 29 will be a maximum so that contact arm 33 will have been moved out of engagement with contact arm 35. I have illustrated the thermally-actuable control switch 25 generally only, since I do not desire to be limited to the particular construction illustrated in Fig. 1 of the drawing, but may use any other thermally-actuable switch effective for the same general purposes as above described for switch 25.

I provide a thermal retarder heater control switch unit designated generally by numeral 39 and mount the same in heat-receiving relation on tank 11 intermediate the ends thereof and preferably at or about the half height of the tank.

The thermal retarder switch unit 39 comprises a casing 41 having a cover 43 thereon, which cover may be held in proper operative position on casing 41 as by a clamping screw 45. Casing 41 is made of heat-conducting material and may be made of aluminum.

I provide a pair of heat-conducting brackets 47 and 49, which brackets are of substantially L-shape and are secured to say the top wall of casing 41. Bracket 47 has fixedly secured thereto one end of a bimetal bar 51 as by rivets 53 or in any other suitable manner. The thickness of bar 51 may be on the order of .025", although this is given for illustrative purposes only and may be varied. The movable end of bimetal bar 51 is provided with a central longitudinal slot 55, and the two spaced end portions have each mounted thereon a pivot plate 57 (Figs. 6 and 7), which pivot plate is of substantially U-shape, having a rounded or circular intermediate portion having an indentation therein for a purpose which will presently appear. The two straight end portions of pivot plate 57 are fixedly secured to the outer end of the side portions of bimetal bar 51.

I provide further a second bimetal bar 59, having a central longitudinally-extending slot 61 at its inner end, the two side portions of bar 59 being of V-shape so that the sharpened ends thereof may fit into the indentations in the pivot plates 57. I provide a contact bridging member 63 on the outer end of the second bimetal bar 59 which is insulatedly mounted on a support 65, which is of substantially T-shape, with a main stem thereof extending through an opening in the outer end of bimetal bar 59 and held there by a cotter pin 67. An over center spring 69 is positioned in slots 55 and 61, the ends of this spring being suitably connected to the bimetal bars 51 and 59 at points thereof just beyond the slots 55 and 61. The two bimetal bars 51 and 59 in combination with the over center spring 69 constitute a snap-acting device of the toggle arm type, as is now well known in the art.

I provide a second bimetal bar 71, having one end thereof connected to the bracket 49 as by rivets 73. The outer end portion of bimetal bar 71 is provided with an elongated slot or recess 75, and the two side end portions of bimetal bar 71 are provided with pivot plates 57 of substantially the same kind as used on bimetal bar 51. Bimetal bar 71 is preferably made of a thicker piece or strip of bimetal.

I provide a second cooperating bimetal bar 77, which may be similar to bimetal bar 59 as to thickness and dimensions. I provide a contact bridging member 79 on the outer end of bimetal bar 77, which is loosely supported on bimetal bar 77 in the same manner as was hereinbefore set forth for the contact bridging member 63 mounted on bimetal bar 59. I provide an over center spring 81, which is positioned in the slots in the adjacent ends of bimetal bars 71 and 77, the ends of spring 81 being connected with bars 71 and 77 adjacent the ends of the slots therein. The combination of the two bimetal bars 71 and 77 and the over center spring 81 provides a snap-acting thermal switch, which is of lesser thermal expansivity than the first named switch comprising bars 51 and 59.

I provide a block 83 of porcelain or other electric-insulating material at the lower end of casing 41 and mount thereon a plurality of contact terminals 85, 87, and 89. Contact terminal 85 is connected, or has secured thereto, a contact terminal which is adapted to be engaged by contact bridging member 79, supported by bimetal bar 77. Contact terminal 87 is of substantially straight bar shape and has a contact terminal 86 secured thereto at its inner end, which is also adapted to be engaged by contact bridging member 79. Contact bridging member 63 is adapted to engage with and be disengaged from a pair of contact members 91 and 93. Contact member 91 is adapted to be electrically connected to contact terminal 85, and contact member 93 is electrically connected to contact terminals 87 and 88.

Contact terminal 89 is connected by a conductor 95 to one terminal of heating coil 97, which is insulatedly mounted on bimetal bar 71 of the second switch of the thermal retarder switch unit. The other terminal of coil 97 is connected by a conductor 99 to contact terminal 85. I may here point out that if coil 97 is made of a resistance material so that the flow of current therethrough will generate heat, the total resistance of coil 97 is relatively high so that the amount of heat generated in heating coil 97 will be relatively very small so that the rise of temperature of the bimetal bar 71 will be relatively slow, and it will require a length of time on the order of five or six hours to raise the temperature of bimetal bar 71 to a value on the order of 250° F. or over, at which temperature snap-acting movement of the normally open switch will occur with resultant engagement of contact bridging member 79 with the contact members on terminals 85 and 87.

A stop member for the two separate and distinct thermally-actuable snap-acting switches includes a member 101 which is of Z-shape, having one end portion secured to the base of casing 41, while the other end portion is of elongated lateral dimensions and has adjustable stop screws 103 therein adapted to be held in any adjusted position by lock nuts 105.

In order to vary the operating temperature of the two pairs of bimetal bars, the respective brackets 47 and 49 are provided with a manually-adjustable screw 107, the inner end of which extends through the offset outer portion of brackets 47 and 49, the end thereof being in engagement with the individual bimetal bars supported by these brackets, while the outer end portion extends through a suitable opening in the covering 43, so that the owner of the hot water tank or a representative of the electric utility company can easily and quickly adjust the same. As is well known, adjustment of stop screw 107 on bracket 47 to permit the free end of bar 51 to move away from the base of the casing and toward the cover, will increase the temperature to which bimetal bar 51 will be subject before opening movement of the switch to the position shown by broken lines in Fig. 3 of the drawing will take place. This, therefore, provides a means for adjusting the control switch of the heater to cause an increase in temperature of the water in the tank before deenergization of the heater is effected, as will hereinafter be described. Referring to the second normally open switch, in which the bimetal bar 71 has a heating coil thereon, adjustment of screw 107 in bracket 49, so that the free end of bimetal bar 71 will be moved closer to the base of the casing, will increase the temperature to which bimetal bar 71 must be heated before it will be moved from its normally open position, shown by the full lines in Fig. 4, to its closed position, shown by the broken lines.

While I have hereinbefore described the heating coil 97 as operating to raise the temperature of bimetal bar 71 by heat generated in coil 97, I do not desire to be limited thereto, since if the bimetal bar 71 is of a magnetizable material, the coil 97 may carry an alternating current which will cause heating of bimetal bar 71 by hysteresis and eddy current losses, as is well known in the art.

Referring now to Fig. 5 of the drawing, I have there shown a diagram of connections which may be used with the thermal retarder illustrated in Figs. 2, 3, and 4 and hereinbefore described. A pair of supply circuit conductors 109 and 111 are provided, which may either be energized continuously during a twenty-four hour day, or in the circuit of which there may be included a time control switch of any kind now used by electric utility companies in the control circuits for domestic hot water tank heaters. Supply circuit conductor 109 is connected by a conductor 113 to contact terminal 85, while supply circuit conductor 111 is connected by a conductor 115 to the resilient switch arm 33 of the lower thermal switch 25. Switch arm 35 is connected by a conductor 117 to one terminal of electric heater 21, the other terminal of which is connected by a conductor 119 with contact terminal 87. It will be noted that I have shown only the first bimetal bars 51 and 71 in Fig. 5 of the drawing, but it is to be understood that the second bimetal bars 59 and 77 are included, the showing of only one of the pair of bimetal bars for each switch being for purposes of simplification only.

Let it now be assumed that the tank 11 has been filled with cold water preparatory to starting the operation and use of the control system embodying particularly my improved thermal retarder. Since both of the thermally controlled switches of the thermal retarder switch unit are in heat-receiving relation relatively to the tank, it will be obvious that bimetal bar 51, as well as bimetal bar 71, will be subject to the temperature of cold water in the tank, with the result that the first switch, comprising bimetal bars 51 and 59, will be moved immediately to closed position, as shown by full lines in Fig. 3 of the drawing. Since the lower thermally-actuable switch 25 is also subject to cold water, it also will be in closed position, the positions of the parts being that shown in Fig. 5 of the drawing. Energization of electric heater 21 will therefore be effected, and heating of the water in the tank will take place. When a single electric heater is positioned around the outside of the lower end portion of tank 11 and is energized, the temperature of the water in the tank will be substantially uniform throughout the length thereof and will increase gradually from 60° or 70° F. to a temperature determined by the adjustment of the lower thermal switch 25 and of the first switch of the thermal retarder switch unit comprising the bimetal bars 51 and 59. Let it be assumed that these two switches are adjusted so that they will move to open position when subject to a temperature on the order of 150° F. Thus when the water in the tank has been heated to a temperature on the order of 150° F., both said switches will move to open position, whereby the heater 21 is deenergized.

Let it now be assumed that hot water is withdrawn from the tank during say the early morning hours, the amount of hot water thus withdrawn being sufficient only to cause the tube 27 of the lower thermal switch 25 to be subject to cold water. This causes closing of the lower thermal switch 25, which causes closure of a circuit through heating coil 97, which will cause slow rise of temperature of bimetal bar 71, this rise of temperature continuing for a period of time on the order of five or six hours, when the temperature of bimetal bar 71 will have become sufficiently high, say on the order of 250° F., or slightly over, with resultant snap-acting closure of the second switch of the thermal retarder switch unit comprising particularly the bimetal bars 71 and 77. The first switch of the thermal retarder switch unit comprising bimetal bars 51 and 59 was subject to the temperature of hot water, with the result that this switch was in open position so that heater 21 was deenergized until an energizing circuit therethrough was closed by snap-acting movement of the second switch comprising bimetal bars 71 and 77.

If, for instance, enough hot water was withdrawn from the tank during the hour of 7 a. m. to 8 a. m., energization of heater 21 would be delayed until around 12 noon or 1 p. m., which is generally a time of low demands for electric energy on the circuit. Further, if such relatively small amount of hot water was withdrawn from the tank during the early evening hours, or say between 5 p. m. and 7 p. m., energization of the heater 21 would not be effected until midnight or 1 a. m, which is the usual off-peak period of the late night hours. Thus if only relatively small amounts of hot water were withdrawn from the tank, the energization of the electric heater of the tank would be delayed until such time when the demands for electric energy were not as heavy as during the other parts of the day and energization of the heater 21 would continue until the tube 27 of the lower switch 25 is again subject to hot water, with attendant opening of switch 25 and deenergization of the electric heater 21 and of the low wattage heating coil 97.

Let it now be assumed that during any part of a twenty-four hour day a much greater amount of hot water is withdrawn from the tank, this amount being sufficient to cause the thermal retarder switch unit to be subject to cold water. This would cause immediate closure of the first thermal retarder switch comprising bimetal bars 51 and 59, with movement of the switch controlled thereby into closed position and resultant energization of heater 21. The first switch operated by bimetal bars 51 and 59 will remain in closed position until enough water has been heated in the tank 11 to subject the thermal retarder switch unit to hot water, when the first switch will move to open position. The closed switch 25 will effect energization of heating coil 97 with resultant closure of the second thermal retarder switch after a predetermined time delay period, when closure of the second switch will occur and reenergization of heater 21 will take place, which energization continues until opening movement of the lower thermal switch 25 takes place, as hereinbefore described.

The thermal retarder heater control switch unit hereinbefore described is therefore effective to maintain a tank substantially half full of hot water at all times, and further to cause the tank to be filled with hot water during off-peak periods of the day. The thermal retarder heater control switch unit embodies two separate switches, each connected in parallel with the other and so designed, constructed, and adjusted that the first switch will be closed when subject to cold water and will be open when subject to hot water, while the second switch will be open when subject to cold or to hot water in the tank and will be closed when the temperature of the bimetal member has been raised to a relatively high temperature, which temperature is above that of hot water in the tank.

While I have illustrated and described a thermal retarder switch unit in which both switches are subject to the temperature of hot water and in which the thermally-actuated members are dissimilarly thermally-responsive, it is evident that it is not necessary to mount the second normally open switch in heat-receiving relation to the water in the tank. This second switch could be positioned anywhere within reasonable distance of the tank and out of close thermal communication with the tank, in which case the temperature at which it would move to closed position might be reduced appreciably as by making the bimetal bars thereof substantially of the same dimensions as those for the bimetal bars of the first switch.

Various modifications may be made in the device embodying my invention without departing from the spirit and scope thereof, and all such modifications coming clearly within the scope of the appended claims are to be considered as covered thereby.

I claim as my invention:

1. A thermal retarder switch unit for controlling a hot water storage tank heater circuit, comprising two bimetal snap-acting switch mechanisms, each comprising a pair of pivotally connected bimetal toggle arms, each pair having a different thermal expansion than the other pair, a heat-conducting casing for said mechanisms adapted to be mounted in heat-receiving relation on a tank, the first switch mechanism being adapted to be in closed position when subject to cold water in the tank and to move into open position when subject to hot water in the tank, the second switch mechanism being adapted to be in open position when subject to cold water and to hot water in the tank and a heating coil for said second mechanism adapted to heat the same and cause closure thereof at a predetermined higher than that of hot water temperature.

2. A thermal retarder switch unit for controlling a hot water storage tank heater circuit, comprising two bimetal snap-acting switch mechanisms having their switches connected in parallel with each other, a heat-conducting casing for said mechanisms adapted to be mounted in heat-receiving relation on a tank, the first switch mechanism being of high thermal responsivity and adapted to be in closed position when subject to cold water in the tank and to move into open position when subject to hot water in the tank, the second switch mechanism being of low thermal responsivity and adapted to be in open position when subject to cold water and to hot water in the tank and a heating coil for said second mechanism adapted to heat the same to a temperature higher than that of hot water and cause closure thereof after a predetermined time period of delay.

3. A thermal retarder switch unit for controlling a hot water storage tank heater circuit, comprising two bimetal snap-acting switch mechanisms having their switches connected in parallel with each other, a heat-conducting casing for said mechanisms adapted to be mounted in heat-receiving relation on a tank, the first switch mechanism being of high thermal responsivity and adapted to be in closed position when subject to cold water in the tank and to move into open position when subject to hot water in the tank, the second switch mechanism being of low thermal responsivity and adapted to be in open position when subject to cold water and to hot water in the tank and a heating coil for said second mechanism adapted to be energized by power from said circuit irrespective of the positions of said switches to heat said second switch mechanism to a temperature higher than that of hot water and cause movement thereof to closed position after a predetermined time period of delay.

4. A thermal retarder switch unit for controlling a hot water storage tank heater circuit, comprising a first bimetal snap-acting switch mechanism including a pair of pivotally connected bimetal toggle arms of high thermal responsivity having two opposite operative positions adapted to be mounted in heat-receiving relation on a tank and to be in closed position when subject to cold water in the tank and to be moved to open position when subject to hot water in the tank, a second bimetal snap-acting switch mechanism including a pair of pivotally connected bimetal toggle arms of low thermal responsivity adapted to be in open position when subject to cold and to hot water in the tank and a heating coil for said second bimetal mechanism adapted to be energized by power from said circuit irrespective of the positions of said switches to cause closure of said second mechanism after a predetermined time period of delay.

5. A thermal retarder switch unit for controlling a hot water storage tank heater circuit, comprising a heat-conducting casing adapted to be mounted in heat-receiving relation on a tank, a first bimetal snap-acting switch mechanism, of high thermal responsivity, in said casing and supported thereby, said first mechanism having two opposite operative positions and adapted to be in closed position when subject to cold water in the tank and to be in open position when subject to hot water in the tank, a second bimetal snap-acting switch mechanism, of low thermal responsivity, in said casing and supported thereby, said second mechanism adapted to be in open position when subject to cold and to hot water in the tank and a heating coil carried by said second switch mechanism adapted when energized to heat the second mechanism to a temperature higher than that of hot water and cause it to move into closed position after a predetermined time period of delay.

6. A thermal retarder switch unit for a hot water storage tank heater circuit, comprising a pair of dissimilarly thermally-responsive bimetal snap-acting switch mechanisms adapted to be mounted on a tank in heat-receiving relation thereto, the high-responsive mechanism being normally closed and adapted to move to open position when subject to hot water in the tank, the low-responsive mechanism being normally open and adapted to move to closed position at a predetermined temperature higher than that of hot water in the tank and a heating coil for the low-responsive mechanism adapted when energized to cause closing of said low-responsive switch mechanism after a predetermined time.

7. A thermal retarder heater circuit control switch unit for hot water tank heaters, comprising two separate circuit switches, two pairs of bimetal toggle arms of different thermal expansivities adapted to be subject to tank water temperature and to actuate said respective switches with a snap action, the high-expansion pair of arms being adapted to hold their switch in closed position until subject to hot water in the tank, the low-expansion pair of arms being adapted to hold their switch in open position until subject to a temperature higher than that of hot water and means for heating the low-expansion arms independent of the tank water temperature and of the position of said switches.

8. A thermal retarder heater circuit control switch unit for hot water tank heaters, comprising two separate circuit switches, two pairs of bimetal toggle arms of different thermal expansivities adapted to be subject to tank water temperature and to actuate said respective switches with a snap action, the high-expansion pair of arms being adapted to hold their switch in closed position until subject to hot water in the tank, the low-expansion pair of arms being adapted to hold their switch in open position until subject to a temperature higher than that of hot water and means for heating one of the low-expansion arms directly independent of the tank water temperature and of the position of said switches to a temperature higher than that of hot water.

9. A thermal retarder heater circuit control switch unit for hot water tank heaters, comprising two circuit switches connected in shunt circuit with each other, two pairs of dissimilarly thermally-expansible toggle arms to actuate said respective switches and adapted to be subject to tank water temperature, the high-expansion arms holding their switch in closed position when subject to cold water in the tank and in open position when subject to hot water in the tank, the low-expansion arms holding their switch in open position until subject to a predetermined temperature higher than that of hot water in the tank and an electric heating coil for causing heating of one of the low-expansion arms to said predetermined temperature irrespective of the positions of said switches.

10. A thermal retarder switch unit as set forth in claim 3 and including means adjustable from the outside of the casing for varying the temperature at which said first switch mechanism moves to open position.

11. A thermal retarder switch unit as set forth in claim 1 and including means adjustable from the outside of the casing for varying the temperature at which said second switch mechanism moves to closed position.

12. A thermal retarder switch unit for a hot water storage tank heater circuit, comprising a first pair of pivotally connected bimetal toggle arms, a contact on the outer end of one of said arms, said toggle arms being adapted to be subject to heat exchange with water in a tank and adapted to move said contact into circuit closing position with a snap action when subject to cold water in the tank, a second pair of pivotally connected bimetal toggle arms, a contact on the outer end of one of said arms, said second pair of toggle arms being adapted to be subject to heat exchange with water in a tank and adapted to move said contact into circuit opening position with a snap action when subject to cold water in a tank and heating means for exchanging heat with one of said second pair of bimetal arms independent of the tank and of the positions of said contacts.

13. A thermal retarder switch unit for a hot water storage tank heater circuit, comprising a first pair of pivotally connected bimetal toggle arms, a first contact insulatedly mounted on the outer end of one of said arms, a first fixed contact connected in said circuit and adapted to be engaged with and disengaged from said first contact, said toggle arms being adapted to be subject to heat exchange with water in a tank and adapted to move said first contact into engagement with said first fixed contact with a snap action when subject to cold water in a tank, a second pair of pivotally connected bimetal toggle arms, a second contact on the outer end of one of said second pair of arms, a second fixed contact connected in said circuit and in parallel with said first fixed contact and adapted to be engaged with and disengaged from said second contact, said second pair of toggle arms being adapted to be subject to heat exchange with water in a tank and adapted to move said second contact out of engagement with said second fixed contact with a snap action when subject to cold and to hot water and an electric heating coil insulatedly supported on one of said second pair of toggle arms for causing heating of one of said second pair of toggle arms independent of the tank and of the positions of said movable contacts.

CLARK M. OSTERHELD.